2,108,781

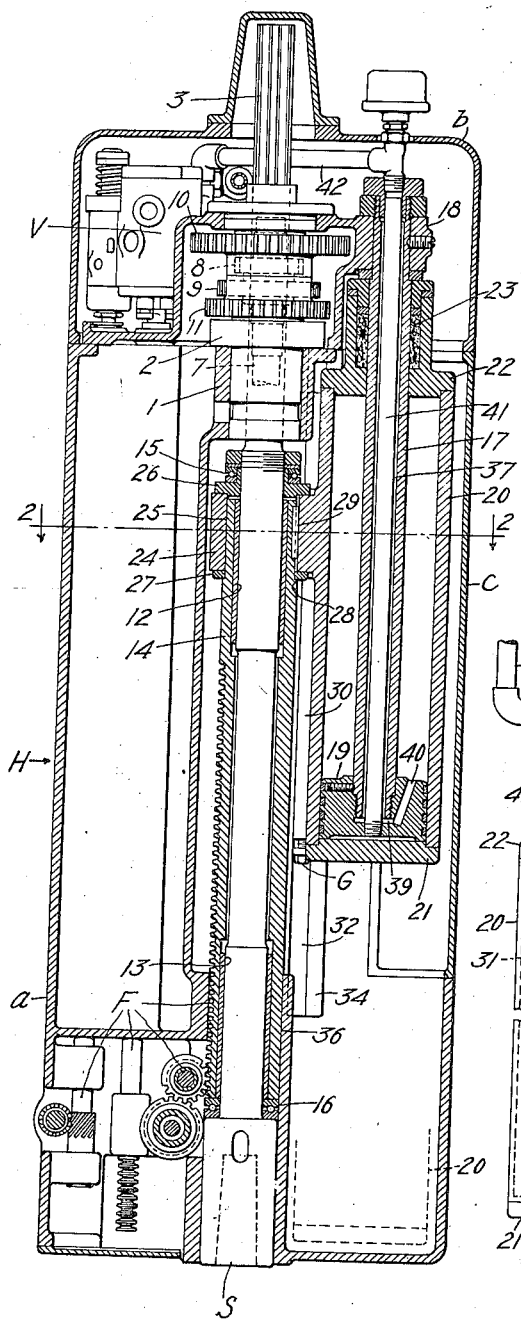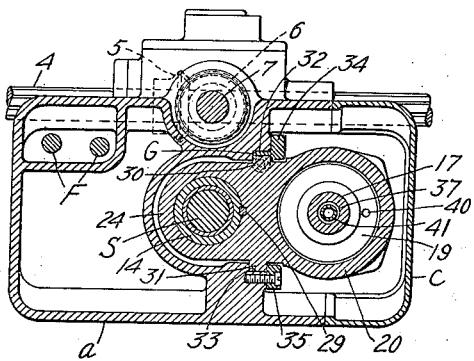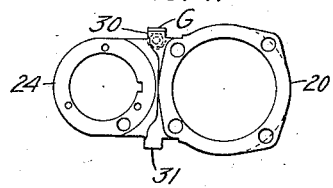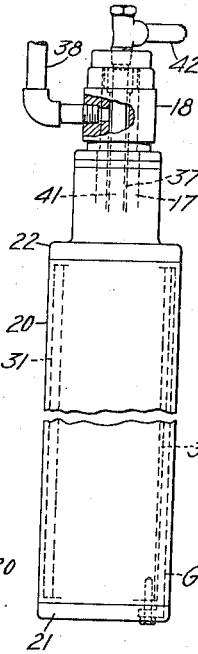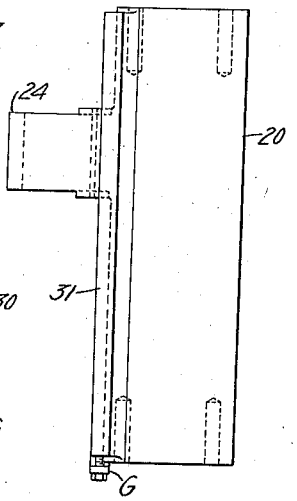
Feb. 15, 1938.  L. L. SCHAUER ET AL  2,108,781
CYLINDER MOUNTING FOR HYDRAULIC MOTORS
Filed March 28, 1933
Inventors
Lawrence Lee Schauer
John H. McKewen
By Attorneys
Nathan, Berman & Helfrich Patented Feb. 15, 1938

UNITED STATES PATENT OFFICE 2,108,781

CYLINDER MOUNTING FOR HYDRAULIC MOTORS

Lawrence L. Schauer, Wyoming, and John H. McKewen, Cincinnati, Ohio, assignors to The Cincinnati Bickford Tool Company, Cincinnati, Ohio, a corporation of Ohio Application March 28, 1933, Serial No. 663,168

6 Claims. (Cl. 77—32)

This invention relates to machine tools and more particularly to the supporting and actuating of reciprocable elements thereof.

Recently hydraulic transmissions have been employed extensively to effect reciprocation of various elements of machine tools. Such transmissions have certain advantages over mechanical transmissions in that they afford a greater flexibility of control; are more simple in construction and, therefore, less expensive to manufacture; and are substantially noiseless in operation.

Some difficulty, however, has been experienced in the employment of hydraulic transmissions especially where it is necessary to incorporate the transmission in a relatively small space, such, for example, as in the tool head of a radial drill.

The present invention has, as its primary object, to overcome these difficulties; to eliminate undesirable features of prior constructions, to provide an arrangement in which the reciprocable element will be better aligned and supported and, therefore, more freely translated than heretofore, and in which the use of flexible conduits is wholly eliminated.

Although the present invention may have a wide range of adaptability in the machine tool art it is particularly useful in connection with the reciprocation of drill spindles and it will, therefore, be shown and described in such connection as a typical embodiment of the invention.

The primary object of this invention has been attained by embodying in a drill head a hydraulic motor of the shiftable cylinder type in which the piston rod is fixed in the tool head and the shiftable cylinder is connected with the translatable tool spindle. The piston rod is provided with two conduits, one of which terminates at one side of the piston head for admitting fluid into one end of the cylinder, and the other of which terminates at the opposite side of the piston head and admits fluid to the other end of the cylinder. Fixed conduits, adapted selectively to be connected with a source of fluid pressure, are permanently connected with the two conduits in the piston rod. While one conduit is admitting fluid to one end of the motor the other serves as a discharge line to transmit the exhaust fluid back to a reservoir in the head.

At one side, the cylinder is formed with an extension within which is secured the translatable spindle sleeve within which the tool spindle is rotatably but non-translatably journaled.

One of the important features of this invention is the improved means for supporting and guiding the cylinder during its reciprocation. This comprises a pair of vertically dsposed guideways provided by the tool head and arranged in a plane extending between the cylinder and the spindle and located at opposite sides of a plane intersecting the axis of the cylinder and spindle. Guide ribs projecting laterally from the cylinder engage the guideways which thereby serve to guide both the cylinder and the tool spindle during their reciprocations.

Other objects and advantages will be in part indicated in the following description and in part rendered apparent therefrom in connection with the annexed drawing.

To enable others skilled in the art so fully to apprehend the underlying features hereof that they may embody the same in the various ways contemplated by this invention, a drawing depicting a preferred typical construction has been annexed as a part of this disclosure and, in such drawing, like characters of reference denote corresponding parts throughout all the views, of which:—

Figure 1 is a vertical sectional view of a drill head embodying the present invention.

Fig. 2 is a section on the line 2—2 of Fig. 1 showing the single guide means for both the hydraulic motor and the reciprocable spindle sleeve.

Fig. 3 is a side elevation of the reciprocable cylinder of the hydraulic motor.

Fig. 4 is a plan view of Fig. 3 and Fig. 5 is a detail side elevation of the upper portion of the hydraulic motor showing the two hydraulic conduits connected with the conduits formed in the piston rod.

Referring more specifically to the drawing the invention is disclosed as embodied in a drill head H comprising a main or body section a, a cap section b, and a front section c, all secured together to form a closed hollow casing. Journaled in a bearing I, formed in the upper portion of the main section a, is a rotatable spindle-driving sleeve 2 within which is splined one end 3 of a tool spindle S, the lower end of which is adapted to carry a suitable tool. The spindle-driving sleeve may be rotated by any suitable means. In Fig. 2 this means is shown as comprising a horizontally disposed shaft 4, common to radial drills, to which is splined a bevel gear 5, which meshes with a similar gear 6 secured upon an upright shaft 7, carried by the tool head. Upon the upper end of the shaft 7 there is splined a gear-unit having gears 8 and 9 (see Fig. 1) adapted selectively to be meshed with gears 10 and 11, respectively, secured to the spindle-driving sleeve 2. Inasmuch as the spindle rotating means forms no part of the present invention further illustration and description thereof is deemed unnecessary.

Intermediate its ends, the spindle is journaled within bearings 12 and 13 provided by a reciprocable sleeve 14. Thrust bearings 15 and 16, engaging annular shoulders on the spindle, prevent relative axial movement between the two.

As hereinbefore stated, reciprocatory movements are given to the spindle by means of a hydraulic motor. This motor preferably consists of a piston-rod 17 having its upper end secured in a bracket 18 fixed to the section a within the cap portion b, a piston 19 secured upon the other end of the piston-rod and a cylinder 20 slidingly fitted upon the piston. The lower end of the cylinder is closed by a disc 21, and the upper end is closed by a head 22 having a gland 23 forming an oil-tight joint about the piston-rod. Projecting from one side of the cylinder 20 is an extension 24 formed with a cylindrical bore 25, within which is fitted the upper end of the spindle sleeve. Collars 26 and 27 secured to the upper and lower sides of the extension and engaging respectively the thrust bearing 15 and a shoulder 28 on the spindle sleeve serve to lock the cylinder and sleeve against relative axial movements, while a key 29 therebetween, holds them against relative angular movement. From the foregoing it will be seen that the cylinder 20 and the sleeve 14 are securely locked together and any reciprocatory movement of the cylinder will be transmitted to the sleeve and thereby to the spindle. Obviously, if these elements are to be freely reciprocable they must be accurately guided and held against relative deflection. This has been accomplished by an improved guiding means now to be described.

Substantially midway between the axis of the cylinder 20 and the axis of the spindle sleeve 14 the cylinder is formed with oppositely projecting guide ribs 30 and 31 fitted to slide in vertically arranged guideways 32 and 33, respectively, formed in an intermediate vertically disposed wall of the body section a of the tool-head. Straps 34 and 35 secured to the section a adjacent the guideways cooperate with the guideways 32 and 33 and form guide channels which receive the guide ribs 30 and 31. The ribs 30, 31 are substantially co-extensive with the cylinder 20 and their engagement with the guideways 32 and 33 affords a very accurate and rigid guide for the reciprocating cylinder. The upper end of the spindle sleeve, being secured in the extension 24 of the cylinder is, therefore, likewise guided by the guideways 32, 33. An additional guide, for the lower end of the spindle sleeve, may be provided by a bearing 36 in the section a of the head. If desired, an adjustable tapered gib G may be secured to the guide rib 30 to engage the walls of the guideway 32 thereby to compensate for wear on the walls of the guides and guideways.

Reciprocatory movements are given to the cylinder 20, and the sleeve and spindle carried thereby, by fluid admitted under pressure into the opposite ends of the cylinder, through the piston-rod. The piston-rod is formed with a bore 37, connected at its upper end with a conduit 38 forming a part of a hydraulic system and the lower end of the bore terminates in a chamber 39 formed in the piston 19, which chamber communicates through a duct 40 with the cylinder 20 above the fixed piston. Thus fluid admitted through the conduit 38, bore 37 and duct 40 causes the cylinder to be shifted upwardly. Extending through the bore 37 in the piston rod, and through the piston 19, is a pipe 41 connected at its upper end with a conduit 42 also forming a part of the hydraulic system above referred to. Fluid admitted through the conduit 42 and pipe 41 enters the cylinder 20 beneath the fixed piston 19 thereby causing the cylinder to be translated downwardly. Any suitable means may be provided for providing the fluid pressure for actuating the hydraulic motor but as this means forms no part of the present invention detailed illustration and description thereof is deemed unnecessary for the purpose of this disclosure. Likewise suitable valve means designated generally as V is provided for selectively directing the fluid pressure through either of the conduits 38 and 42 and simultaneously therewith connecting the other with a reservoir adapted to receive the fluid discharged from the exhaust end of the motor. Also suitable means designated generally as F is provided for manually and automatically actuating the valve means to effect the desired rate, direction and extent of movement of the tool spindle. For a more complete understanding of the hydraulic system and the control means therefor reference may be had to our co-pending application, Serial No. 663,167, filed March 28, 1933, now Patent No. 2,027,705 issued January 14, 1936.

From the foregoing it will be perceived that there has been provided a single improved mounting and guide for both the reciprocating cylinder of a hydraulic motor and the tool spindle translated thereby.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, we claim as new and desire to secure the following combinations and elements, or equivalents thereof, by Letters Patent of the United States:—

1. A machine tool having a substantially closed head member; a tool spindle assembly reciprocably mounted in said head member comprising a spindle sleeve element and a spindle shaft rotatably journaled therein; bearing means provided by said head member adjacent one end of said sleeve element for guiding said sleeve; a first guide means provided by said head member for guiding said shaft, said bearing and guide means being in coaxial alignment and spaced from each other a distance substantially equal to the stroke of reciprocation of said assembly; guide means for supporting and guiding said sleeve element intermediate said spaced bearing and first mentioned guide means, comprising a bodily translatable bracket member secured to said sleeve member and reciprocable therewith, guide ribs formed upon said bracket and located in a plane parallel to and laterally removed from the axis of said assembly, and cooperating guideways formed within said head member for guiding and supporting said ribs during reciprocation of said assembly; and power means including relatively translatable elements within said head member, one element of said power means being rigid with said translatable bracket member and located at the opposite side of said last mentioned guide means for reciprocating said bracket in said last mentioned guide means and thereby said spindle assembly in said spaced bearing and first mentioned guide means, said guide ribs on the bracket extending also on the said element of the power means connected to the said bracket whereby said guide ribs and cooperating guideways serve also to guide and support the translatable element of said power means.

2. A drilling machine combining a substantially closed head member; a spindle sleeve translatably mounted therein and adapted to project through one wall of said closed head; bearing means adjacent the outer end of said sleeve for supporting and guiding same; a spindle journaled in said sleeve; means movable with said sleeve for supporting the inner end of said sleeve member, comprising a bracket member secured to the inner end of the sleeve member and projecting laterally therefrom; guide means formed upon said laterally projecting portion extending in a direction parallel to the axis of said sleeve member, and complemental guide means provided within said head member cooperating therewith to support and guide the inner end of said sleeve member during its translatory movements; and power means for translating said bracket member including a relatively translatable piston and cylinder element arranged completely within said head member, one of said last mentioned elements being secured to said head member and the other to the laterally projecting portion of said bracket member at the side of said guide means opposite to the spindle sleeve and translatable therewith, said guide means on the bracket extending on the said translatable element of the power means whereby said bracket and guide means also serve as guide and supporting means for the said movable element of said power means.

3. A drilling machine combining a head member, a translatable drill spindle assembly vertically supported within and substantially enclosed by said head, comprising a rotatable and axially translatable spindle shaft member and a translatable but non-rotatable spindle sleeve member; upper and lower axially aligned spaced guide means for said assembly, the space between said guide means being substantially equal to the distance of available translation of said assembly; power means for rotating said spindle shaft; power means within the said head for translating said assembly; a bracket member secured to said sleeve member at a point intermediate said spaced guide means and translatable with said sleeve member; and rectangular shaped guiding surfaces extending parallel to the axis of the spindle shaft and provided in part by said head and in part by said bracket member for supporting and guiding said assembly in the region between said spaced guide means throughout its normal range of translation.

4. A drilling machine combining a head member, a translatable drill spindle assembly supported within and substantially enclosed by said head, comprising a rotatable and axially translatable spindle shaft member and a non-rotatable spindle sleeve member translatable therewith; hydraulically actuated means located within said head and laterally offset from the axis of said spindle assembly for translating said assembly; a pair of axially aligned spaced guide means for guiding end portions of said assembly, the space between adjacent ends of said guide means being substantially equal to the distance of available translation of said assembly; said hydraulic means including a piston element and a relatively translatable cooperating cylinder element; and a rigid connection between one of said elements and said assembly intermediate said spaced guide means and bodily translatable in said head in the region between said spaced guide means for translating said assembly.

5. A drilling machine combining a head member, a translatable drill spindle assembly supported within and substantially enclosed by said head, comprising a rotatable and axially translatable spindle shaft member and a non-rotatable spindle sleeve member translatable therewith; a pair of axially aligned spaced guide means in said head member for guiding the end portions of said assembly said guide means being spaced from each other a distance substantially equal to the distance of available translation of said assembly; power means for rotating said spindle shaft; means within the head for translating said assembly, including a translatable member connected with said assembly and bodily movable therewith between said spaced guide means; and additional guide means provided in part by said translatable member and in part by said head for supporting said assembly in the region between said spaced guide means throughout its normal range of translation.

6. The combination set forth in the preceding claim in which said two last mentioned means comprise a bracket member secured to one end of the spindle sleeve member, a pair of relatively long and narrow guide ribs on said bracket extending also on said translatable member of said spindle assembly translating means said guide ribs being located in a single plane laterally disposed from and parallel to the axis of the spindle assembly and at opposite sides of a plane intersecting the said axis; and a pair of complemental and cooperating guideways provided by said head member providing supporting and guiding surfaces for said ribs.

LAWRENCE L. SCHAUER.
JOHN H. McKEWEN.